//<br>
2,731,570

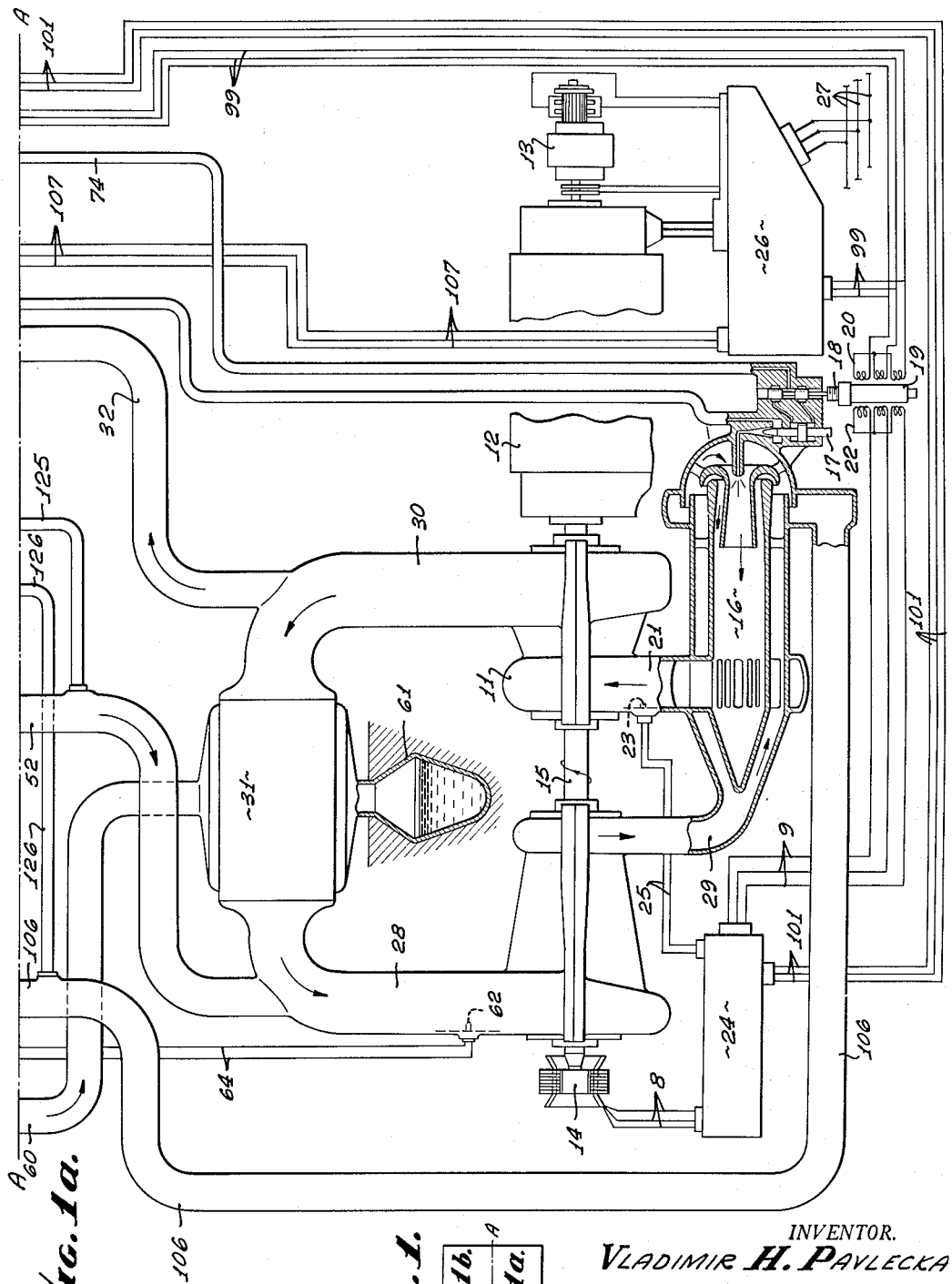

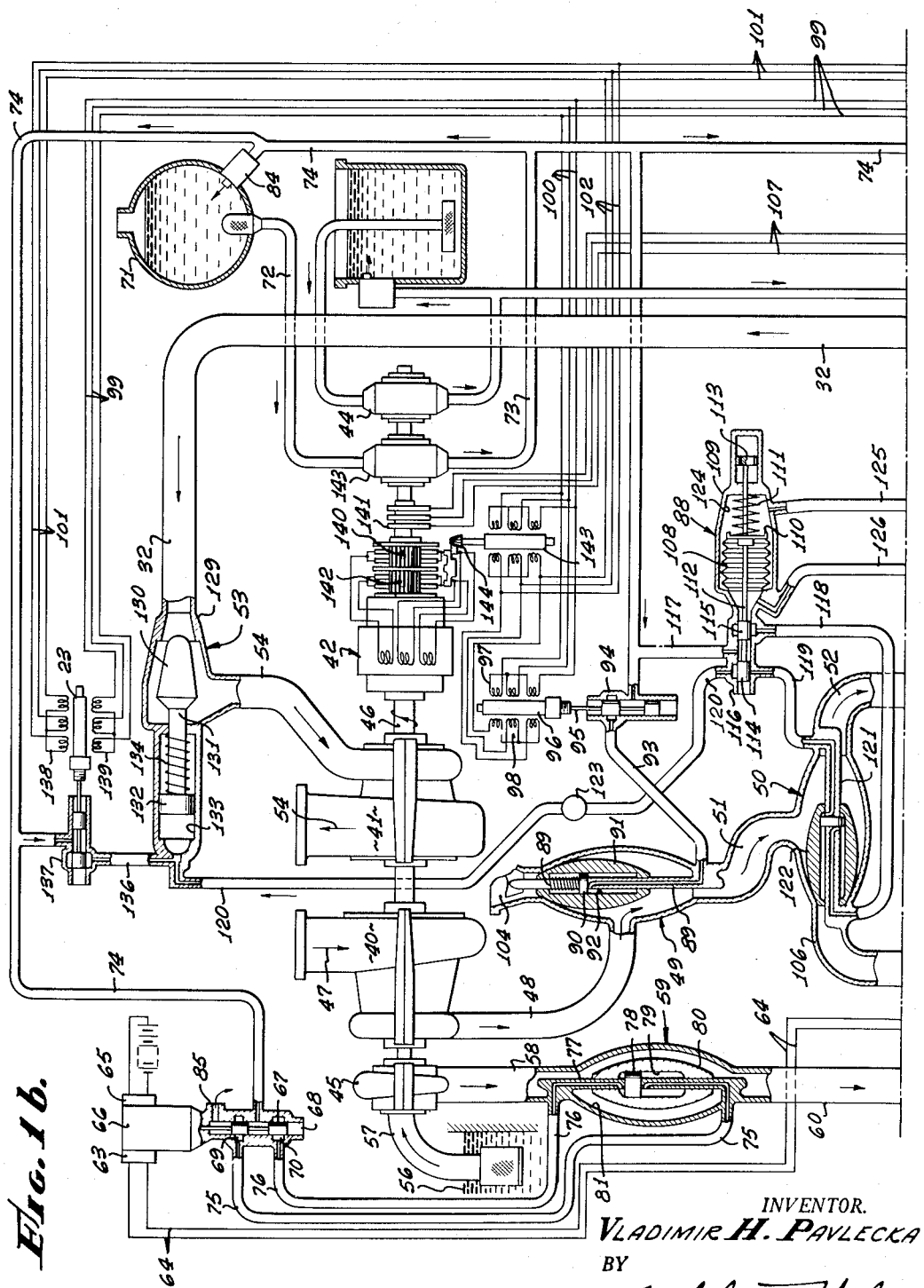

CONSTANT TEMPERATURE-VARIABLE DENSITY GAS TURBINE POWER PLANT

Vladimir H. Pavlecka, Pacific Palisades, Calif.

Application July 28, 1952, Serial No. 301,224

18 Claims. (Cl. 290—4)

This invention relates to gas turbine power plants, and more particularly to a gas turbine power plant having a main gas turbine set and an auxiliary gas turbine set for varying the density of gases used for operating the main set as a function of an external load while the maximum, intermediate and minimum temperatures of the modified Joule cycle, used by the main set, remain constant, whereby the thermal efficiency of the main set is maintained substantially constant. The invention also relates to control systems for achieving proper operation and starting of the entire power plant in accordance with the above modified cycle.

This invention is a continuation-in-part of the copending application, Serial #557,654, filed October 7, 1944, entitled "Method of Operation and Regulation of Thermal Power Plants," in the name of V. H. Pavlecka et al., now U. S. Patent 2,608,822 issued September 2, 1952.

It is an object of this invention to provide a gas turbine power plant comprising the main gas turbine set and the auxiliary gas turbine set, the latter regulating the operating pressure of the main set with any change in an external load and maintaining the temperatures of the thermodynamic cycle of the main set constant by means of various control systems.

Still another object of this invention is to provide a constant flow gas turbine power plant having a substantially constant thermodynamic efficiency and speed at variable load and a control system for such plant.

The novel features which are believed to be characteristic of the invention, both as to its organization and method of operation, together with further objects and advantages thereof, will be understood better from the following description considered in connection with the accompanying drawings in which the invention is illustrated by the way of an example. It is to be expressly understood, however, that the drawings are for the purpose of illustration and description only, and are not intended as a definition of the limits of the invention.

Fig. 1 illustrates the relative positions of Figs. 1a and 1b with respect to each other;

Figs. 1a and 1b are the schematic diagrams of the power plant when the two figures are joined along a line A—A.

For a more detailed description of the modified Joule cycle and the method of its operation, reference is made to the parent Patent No. 2,608,822, more fully identified above, where the cycle is illustrated in Fig. 1 and its advantages are described in the specification of the parent case, which is made a part of this disclosure. The subject continuation-in-part application discloses the connections used between the main and auxiliary power plants, which are identical to those disclosed in the parent case, and also discloses the entire control system required for operation of such plant, the latter constituting the subject-matter of this invention.

Referring to Figs. 1a and 1b, the main gas turbine set is illustrated in Fig. 1a, while the auxiliary set is illustrated in Fig. 1b, with the control system and connections between the two plants being illustrated in both figures. The main set includes a main compressor 10, a main gas turbine 11, an alternating current generator 12, an exciter 13, and a constant frequency generator 14, all mounted on a single shaft 15. Although the outlines of the compressor and turbine indicate that they are of axial type, the teachings of this invention are applicable to any type of dynamic compressor and turbine. The main set also includes a reverse flow combustion heat generator 16 provided with a fuel needle valve 17 whose position is controlled by a hydraulic valve 18 operated by a reversible servomotor 19, having two sets of three-phase field windings 20 and 22 which create two oppositely rotating fields. Windings 22 are connected to conductors 9 and a control equipment within a control box 24, the control equipment being connected to the constant frequency generator 14. Windings 20 are connected through a control box 26 to the output of the main generator 12. As will be described later, normally, the two opposing fields are equal and the rotor of the servomotor 19 is at a stand-still. When the external load, connected to a bus-bar 27, changes, the rotor of the servomotor operates the hydraulic valve 18, which, in turn, resets the fuel nozzle 17. The same servomotor 19 is also responsive to any change in temperature of gases within a duct 21 which connects the output of combustion chamber 16 with the input into gas turbine 11. This is accomplished by placing a thermocouple 23 or other temperature-sensitive device into duct 21, connecting the output of the thermocouple over conductors 25 to an amplifier within the control box 24, and utilizing the variation in the amplitude of the output signal of the amplifier for controlling the amplitude of the three phase current supplied by the constant frequency generator 14, over conductors 8 and 9, to the three phase winding 22 of the servomotor 19. Systems of the above type are known in the art of electrical controls, and need no additional description or special illustration. The control systems of the above type generally take the form of variable resistances connected in series with conductors 9 whose values are varied by means of a reversible motor connected to a Wheatstone bridge; auto transformers with a resettable arm, etc. Whatever the form of the above temperature-sensitive system, it produces one result—it makes the three-phase current flowing over conductors 9 and the three-phase windings 22 a function of the instantaneous temperature of the gases leaving the combustion chamber 16 and entering turbine 11. As will be explained more in detail later, the servomotor 19 performs one function, namely, to keep the temperature of gases in duct 21 constant irrespective of the load connected to the main set.

When the plant is fully in operation, the main compressor 10 receives precompressed gases from the auxiliary compressor through a duct 28, and the compressed gases leave compressor 10 through a duct 29, whereupon the compressed gases enter the combustion heat generator 16, and, upon being heated, leave the latter and enter the main gas turbine 11. After expansion through the turbine, the exhaust gases leave the main turbine through a duct 30 and the larger part of the exhaust gases enters a heat exchanger 31, while the remaining part enters a duct 32 which is connected to the auxiliary turbine where it is used for operating the auxiliary turbine, the latter normally acting as a prime mover for the entire auxiliary set. The exhaust gases, entering heat exchanger 31, are cooled and then sent back to the main compressor 10 for recirculation in the main set.

The auxiliary gas turbine set comprises a compressor 40, a turbine 41, a motor-generator machine 42, and three pumps: an oil pump 43, a fuel pump 44, and a water pump 45. The entire set is mounted on a single shaft 46. Fresh air enters compressor 40 at an intake port, as illustrated by an arrow 47; it leaves compressor 40 through a duct 48 and, after passing through two valves 49 and 50 and a duct 51, it enters a duct 52, the latter being connected to duct 28, which, in turn, is connected to the main compressor 10. Accordingly, when the valves 49 and 50 are in the positions illustrated in Fig. 1b, fresh air, after being compressed in the auxiliary compressor 40, is conducted to the main compressor 10 where it is compressed still further, i. e. the two compressors are connected in series. Duct 32, which is connected to the main turbine through duct 30, terminates in a valve 53 which is connected to the auxiliary turbine through a duct 54. Therefore, part of the exhaust gases from the main turbine normally are used for operating the auxiliary turbine 41, whereupon they are discharged into an atmosphere, as illustrated by an arrow 54.

*Cooling system for heat exchanger 31.*—The illustrated heat exchanger 31 is of the cross-flow, water-cooled type although other types of heat exchangers are suitable. The cooling water system includes a water well 56, an intake pipe 57, water pump 45, a duct 58, a valve 59, a duct 60, heat exchanger 31, and a sump 61. The position of valve 59 is controlled by a thermocouple 62 or any other type of temperature sensitive element, connected to a differential amplifier 63 over conductors 64 whose output, upon proper amplification, is used for operating a relay system 65. The relay system, in turn, operates a reversible motor 66 which, in turn, either lowers or raises a two-way valve plunger 67 within its cylinder 68 until motor 66 stops. Motor 66 stops when either port 69 or 70 is opened upon longitudinal sliding of plunger 67. When this takes place, then one of these ports becomes connected to a source of oil pressure 43, which is the previously mentioned oil pump 43 driven by the auxiliary set 40—41—42. The oil pump 43 is connected to an oil tank 71 through an oil pipe 72; oil under pressure leaves pump 43 through an oil pipe 73, and it reaches the valve cylinder 68 through a pipe 74. The cylinder ports 69 and 70 are connected to oil pipes 75 and 76, respectively, these pipes being connected to the opposite ends of the central stem 77 of valve 59. Stem 77 is provided with a fixed piston 78 which is mounted within a cylinder 79 of a shuttle bobbin 80. The central stem is provided with two oil channels and orifices located at the opposite sides of piston 78 and opening into cylinder 79. From the above, it follows that oil pressure introduced through pipe 75, will force the oil into the lower portion of cylinder 79, which, in turn, will force bobbin 80 to travel downward, thus opening the valve seat 81, which connects the water duct 58 to the water duct 60. The latter is connected to the heat exchanger 31, and therefore cooling water will flow from the water reservoir 56 through water pump 45, pipe 58, valve 59, pipe 60, heat exchanger 31 and into sump 61. The position of shuttle 80 within valve 59 is controlled by thermocouple 62 and, therefore, gases entering the main compressor 10 are kept at constant temperature, which is essential if one is to maintain the previously mentioned substantially constant thermodynamic efficiency of the main unit, including compressor 10 and turbine 11. Shuttle bobbin 80 is illustrated in its extreme lower position, which means that valve 59 is wide open, and, therefore, maximum flow of cooling water is supplied to heat exchanger 31 at this instant. The above corresponds to maximum load conditions on bus-bar 27, generator 12 and turbine 11.

Before proceeding with the description of the remaining portion of the power plant, it should be mentioned here that the oil pressure system is provided with a pressure regulating and safety valve 84 interconnecting the oil tank 71 with pipe 74, the oil tank 71 being open to an atmospheric pressure. It should be noted here, also, that the return pipes, such as pipe 85 connected to tank 71, are not illustrated in the drawing for the sake of simplifying the drawings.

*Control valves in the output of the auxiliary compressor 40*

There are two, serially-connected valves on the output side of the auxiliary compressor 40: the pressure dumping valve 49, and the starting valve 50, the position of valve 50 being controlled by the pressure-sensitive valve 88. Valve 49 is similar in its construction to valve 59 except that it is spring-biassed on one side by a spring 89, which normally keeps this valve closed, as illustrated, so that the compressed air from compressor 40 follows the path reaching the main compressor 10; this path is illustrated by the arrows. This path is used when the power plant is in operation, with a steady load being connected to the bus-bar.

As in the case of valve 59, valve 49 has a fixed central stem 89, fixed piston 90, bobbin 91 and cylinder 92 which communicates with an oil pipe 93 through a centrally located bore within stem 89. The other end of pipe 93 opens into the cylinder of a valve 94 having a valve stem 95 whose position within the cylinder is controlled by a reversible motor 96. Several reversible motors of identical type are used for controlling opening and closing of the oil valves identical to the oil valve 94. Four motors in all are used, and they are motors 96, 143, 123 and 19. The method of their operation will be described later under the heading "Regulation motors 96, 143, 123, and 19," which follows this heading. Suffice it to say at this time that motor 96 has one set of three-phase windings 97 connected to the main generator over conductors 99 and 100, and an identical set of windings 98 connected to the constant frequency generator 14 over conductors 101 and 102, the rotating fields of the two windings normally neutralizing each other. When there is a sudden decrease in load, there is a rise in voltage on the bus-bar 27, and rotor 96 rotates in the direction of the stronger field connecting pipe 93 to pipes 103, 74, 73 and oil pump 43, thus connecting cylinder 92 to the oil pressure. Bobbin 91 is moved in the downward direction which connects air duct 48 and the auxiliary compressor 40 to an atmospheric pressure through an open end orifice 104. This at once releases the air pressure at the input of the main compressor 10. Valve 49, through its spring 89, is biased to respond only when there is a very sudden and large rise in the bus-bar voltage, since there are additional control means available for reducing the output of the main turbine, such as needle valve 17 in the fuel nozzle, voltage regulators in the control box 26, motor-generator machine 42, and valve 53, all of which are also available for restoring the equilibrium. This will be described more fully later in the specification.

The starting valve 50 is used only during the starting period of the plant. The position of this valve is controlled by the pressure-sensitive valve 88 which responds to the pressures in the ducts 52 and 106. Duct 52 leads to compressor 10, while duct 106 is connected to the combustion heat generator 16. When the plant is in the running condition, valve 50 is in the illustrated position, and the output of the auxiliary compressor is connected to the input of the main compressor through the ducts 48, 51, 52 and 28. Accordingly, under normal running conditions the two compressors are connected in series and the pressure reaching the main turbine 11 is equal to the combined compression ratio of the two compressors.

During starting period, the auxiliary set is started from bus-bar 27 by utilizing machine 42 as an alternating current motor. The output of the auxiliary compressor then is conveyed to duct 106, valve 50 moving to the right position closing off duct 52. The entire output of the auxiliary compressor is discharged through duct 106 into the combustion heat generator 16, is heated and then discharged into the main gas turbine 11, which starts the rotation of the main set. As will be pointed out more fully later, valve 53 is also in the closed position during the starting period, and therefore duct 32, interconnecting the exhaust portion of the main turbine 11 with the auxiliary turbine 41, is closed. Therefore, the motor-generator machine 42 is operating during starting period as a motor, power being furnished by the bus-bar 27 to motor 42 over conductors 107. The entire exhaust from turbine 11 flows to the main compressor 10 and then back to the turbine through the heater 16, insuring fast building up of pressure and temperature of the operating cycle and fast starting of the set.

The pressure-sensitive valve includes gas-tight, metallic bellows 108 which divide the valve chamber 124 into two gas-tight compartments separated from each other by the flexible pressure-responsive bellows 108. The right chamber is connected to a pipe 125 which opens into the pre-compressed air duct 52, and therefore the air pressure in the right chamber is always equal to that in duct 52. The left chamber is connected to a pipe 126 opening into duct 106, and therefore the pressure in the left chamber corresponds to that in duct 106. To make the two chambers gas-tight with respect to each other, bellows 108 makes a gas-tight peripheral joint with the outer wall of casing 109 of the valve. At the other end, bellows 108 makes a gas-tight joint with a metallic plate 110 which completes the gas-tight, flexible diaphragm formed by the bellows between the right and left chambers of the valve. Plate 110 also acts as a seat for a spring 111 and as a connecting means between the bellows and a spindle 112 with which it forms a gas-tight joint. Spindle 112 terminates in a dash-pot piston 113, and two valve pistons 114 and 115 forming a sliding fit with the valve cylinder 116. Four pipes 117, 118, 119 and 120 are connected to the valve cylinder 116; pipe 117 is connected to the oil pump 43, and therefore brings oil under pressure to the cylinder. The two pipes 118 and 119 are connected to the central stem 121 of valve 50, and therefore supply oil into the cylinder of bobbin 122 for placing it into two extreme positions and for holding it in the above positions. Pipe 120, having a one-way flow check valve 123, connects the pressure-sensitive valve 88 and its cylinder 116 to the cylinder of valve 53 used for shutting off the auxiliary turbine 41 from the main turbine 11 during the starting period and also for shutting off duct 32 when there is a very large and sudden increase in load. Valve 53, as will be explained more fully later, is operated through valve 88 only during the starting period, and its position otherwise is controlled by the motor 123.

The operation of the valves 50 and 88 is as follows: When power plant is at a stand-still, the pressures in the ducts 52 and 106 are equal to the atmospheric pressure, and therefore the pressures in the left and right chambers of valve 88 are also equal. When this is the case, spring 111 will expand and will compress the bellows 108 until the two forces will become equal. Spindle 112 will travel to the left and piston 114 will open the ports to which the two pipes 120 and 119 are connected. Therefore pipe 117 will be in hydraulic communication with the pipes 119 and 120. When the auxiliary set is started by connecting the alternator 42 as a motor to bus 27, the oil pump builds up the oil pressure which is transmitted to pipe 117, then to pipe 119, through a duct in stem 121 and then into the cylinder of bobbin 122 whereupon bobbin 122 will travel to the right, closing off duct 52 from duct 51 and directing the precompressed air into duct 106 and heater 16. When pressure in duct 106 rise to a sufficiently high value, which takes place when the auxiliary and the main sets are substantially up to their normal speeds, the pressure-sensitive valve responds to the rise in pressure in duct 106 by expanding bellows 108. Such expansion of the bellows against spring 111 makes spindle 112 travel to the right. Pistons 114 and 115 also travel to the right of the illustrated position, and pipe 117 becomes hydraulically connected to pipe 118, while pipes 119 and 120 become connected to a drain pipe (not illustrated) connected to the oil tank 71. The above pipe connections return bobbin 122 to the illustrated position, which connects the output of the auxiliary compressor 40 to the input of the main compressor 10; as stated previously, this is the normal series or tandem connection of the two compressors which is used when the entire plant is carrying a normal load. Because of the series connection of the two compressors under operating conditions, the pressure in duct 106 will be higher than in duct 52 by the compression ratio of the main compressor 10. This is so because duct 106 remains open all the time at that end which connects it to heater 16, and the pressure in heater 16 is equal to the pressure on the output side of compressor 10. Therefore, bellows 108 will remain in the expanded condition and pipe 117 will remain connected to pipe 118, thus keeping bobbin 122 in the illustrated position. The position of the pressure-sensitive valve 88 which is illustrated in Fig. 1b, therefore, is a transitional position, at which time the two ports in the valve cylinder 116 remain momentarily closed when spindle 112 and the bellows travel from one operating position to another.

From the above description of the functioning of valve 50, it follows that it is used only during the starting period. Accordingly, during the starting period the main compressor 10 is connected in parallel with the auxiliary compressor 40 until the main set comes up to speed. The parallel connection of the two compressors is obtained in the following manner: From the previous description given above, it follows that the auxiliary compressor 40 discharges its output directly into the heater 16 through duct 106. Since valve 53 now is closed, the entire exhaust of the main turbine now is discharged into the heat exchanger 31, duct 28 (duct 52 is closed) and then into the compressor 10, whereupon the compressed gases are ducted through duct 29 back into heater 16. Therefore, the two compressors both discharge into the heater 16 during the starting period, i. e., they are connected in parallel, at least insofar as their outputs are concerned. Their inputs are altogether different: the auxiliary compressor is open to fresh air, while the main compressor is connected to the main turbine. Upon completion of the starting period, the two compressors are then connected again in series with the aid of the valves 50 and 88. The action of the two valves is entirely automatic and is controlled by the pressures of the compressed gases and atmospheric pressure as these pressures appear in the ducts 52 and 106.

*Valve 53*

The only remaining valve which needs description is valve 53. This valve is connected between the ducts 32 and 54. Therefore, this valve, when open, connects the auxiliary turbine 41 to the exhaust of the main turbine 11, in which case part of the exhaust gases is used for driving turbine 41 and, through it, either the entire or a part of the auxiliary set. As will be pointed out later, normally, during steady load conditions, the auxiliary set obtains a part of its motive power from turbine 41, and the remaining part from alternator 42, which runs as a motor at this time. When there is a sudden dumping of the external load by the bus-bar 27, the auxiliary turbine 41 not only drives the entire auxiliary set but it also drives alternator 42 as a generator which furnishes some power to bus 27. When valve 53 is closed, turbine 41 does not furnish any power and runs as an idle unit, motive power being furnished at this time, for operating the auxiliary set, by the motor-generator machine 42, which at this time runs as a motor obtaining its power from bus 27. This mode of operation takes place when the entire plant is started from a stand-still position. At this time it is important to come up to the fully running, normal pressure state of the cycle as quickly as possible, and, therefore, it is best to disconnect turbine 41 from turbine 11 and to discharge turbine 11 into compressor 10. Moreover, such method of starting the power plant permits full utilization of the motor-generator machine 42 from the very beginning of the operation of the power plant, thus avoiding the expense of having a separate starting motor on shaft 15 of the main set which would be useful only during the starting period and would furnish only windage losses during the normal running of the main set. This is not the case insofar as machine 42 is concerned since, as will be pointed out later, it participates continuously during normal operation of the main set as a voltage regulating machine for bus-bar 27.

Valve 53 is provided with a housing 129, a valve plug 130, a stem 131, a piston 132, a cylinder 133, and a spring 134; the spring normally holds the valve in open position, connecting duct 32 to duct 54. Cylinder 133 is connected to oil pressure pipes 136 and 120. Pipe 120 is connected to the pressure-sensitive valve 88 which connects cylinder 133 to the oil pump 43 during the starting period of the plant, as described previously. Therefore, oil under pressure reaches cylinder 133 through pipe 120 and piston 132 is pushed to the right, thus shutting off valve 53. When the power plant comes up to speed, pipe 120 becomes disconnected from the oil pump by valve 88, and from then on the oil pressure in cylinder 133 is controlled by the servo motor 123 whose two field windings 138 and 139 are connected over conductors 101 and 99 to the constant frequency generator 14 and main generator 12 or bus 27, respectively. Normally, at constant load, cylinder 133 is disconnected from pipes 136 and 120, and valve 53 is held in open position by spring 134. When there is an increase in load, the bus-bar voltage drops temporarily and servo motor 123 connects pipe 136 to pipe 74, introducing oil under pressure into cylinder 133, thus partially closing valve 53. If there is a very sudden change in load, valve 53 may close itself altogether for a limited time until equilibrium is restored, whereupon it reopens again. Such operation of valve 53 increases the gas density and pressure of the main cycle so that the main set will be able to furnish greater output. Spring 134 shifts valve 53 into a wide open position when there is a sudden decrease in load. As in the prior cases, the return of an oil drain pipe connected to cylinder 133 is not illustrated in the drawing for the sake of simplicity of the drawing.

*Regulation motors 96, 143, 123 and 19.*—The method of regulating the positions of the control valves 94, 137, and 18 utilizes two oppositely biassed, rotating electromagnetic fields acting on squirrel cage rotors of the servo motors. The operation of this type of control system is based on the fact that the voltage generated by the constant frequency generator 14 will remain substantially constant at the instant when the voltage across the bus-bar 27 will go up or down because of change in the external load. This is due to the fact that the main set has a substantial mass and the inertia of this set will prevent it from altering its speed of rotation instantaneously, while the armature reaction of generator 12 is a direct function of the armature current and therefore will oppose the magnetomotive force produced by the field windings as quickly as there is a change in the armature current. Therefore, the drop or rise in the bus voltage is many times more rapid than the change in speed of ratio and this difference in time is utilized for controlling the rotors of the servo motors by means of two opposing rotating fields. As long as the two voltages are equal, the currents flowing in the windings, such as windings 97 and 98 are equal, and therefore the rotating fields are also equal and the two torques neutralize each other. Therefore, the squirrel cage rotors 96, 123 and 19 are at a stand-still. These rotors will follow the stronger field which occurs when there is a marked change in load in either direction until the magnitudes of the two fields are made equal again by decreasing or increasing the torque produced by the main turbine.

*Motor-generator machine 42.*—This machine may be either a direct current machine capable of operating as a motor or as a generator and at a variable speed, or an alternating current machine having the same characteristics. In Fig. 1b it is illustrated as an alternating current machine of the Schrage type, with a non-salient pole stator providing alternating rotating field, a rotor connected to two commutators 140 and 142 and a brush assembly connected to a servomotor 143 through a set of gears 144 which are provided for varying the angular position of the brush assembly for varying the speed of the machine when it is operating as a motor. When the main power plant carries a load, alternator 42 runs as a motor, receiving its power from bus 27 through the conductors 107 and sliprings 141. The power supplied by alternator 42 is that which is necessary for supplementing the power furnished by turbine 41. When there is an increase in external load, servomotor 143 will shift the brush assembly to the position increasing the speed of the alternator, which will increase the compression ratio of the auxiliary compressor with the concomitant increase in the density of the gases entering the main compressor. Such regulation of the speed of rotation of the variable speed alternator 42 will produce the previously mentioned variable density-constant temperature cycle for the main unit, the temperature of the main cycle being maintained constant by regulating the amount of fuel by means of servo mechanism 19, Fig. 1a and by means of the thermocouple unit 62, which controls the amount of cooling water reaching heat exchanger 31 by regulating the position of valve 59.

From the above description of the structure and mode of operation of alternator 42 it follows that it draws power from bus 27 during the starting period, during the steady running period, and when the power plant shifts itself from a lighter load to a larger external load. It acts as a generator when the reverse shift in load takes place because at this instant valve 53 is wide open and the auxiliary turbine 41 delivers excess of power sufficient to operate the entire auxiliary set, and, in addition, to run Schrage machine as a generator only during the transition period from heavier to lighter external load. It may occur to the reader that the Schrage machine is operating exactly in the reverse order desired: it delivers power to bus 27 when power is not needed, and draws power from bus 27 when this bus is called to deliver more power. It should be realized, however, that the main performer is the main unit, and therefore the operating conditions of the latter should be adjusted to the load conditions as quickly as possible, which is the function performed by the auxiliary set. Therefore, by loading the main turbine so that it must operate the entire auxiliary set and the Schrage machine as a generator, the main turbine is required to shift some of its excess power to the auxiliary set which now acts as a brake on the main turbine. This is not accomplished through any direct mechanical connections or shafts, but it is accomplished in thermodynamic and fluid-dynamic terms by opening to the limit valve 53 and, in an extreme case, valve 49, thus lowering all pressures of the main cycle. When the external load is on the increase, more power is drawn from bus 27 by the Schrage machine while it is needed elsewhere, but the concomitant temporary loss of power to the Schrage machine by bus 27 is more than compensated by the additional power delivered by the main set due to the simultaneous increase in the density of gases in the main cycle.

*Control box 26.*—Control box 26 is illustrated in a block form because the electrical apparatus within this box in actuality represents an upright control panel or a plurality of panels mounting an electrical equipment known to the electrical art. This equipment includes voltage regulators which vary the field current of exciter 13, none of the above being illustrated in the drawing. The panels include usual recording instruments, circuit breakers, overload relays, voltage relays, a power rectifier if a variable speed direct current machine is used instead of the Schrage alternator, protective equipment for the three-phase line 99 going out to four servomotors 19, 123, 96, and 143 and to the Schrage alternator, etc. It is obvious that even in the latter case, the connections indicated in the drawings are of purely diagrammatic nature, since each circuit will require its own individual lines, balancing means, and protective equipment which is known to the electrical art, and therefore need no illustration or description here.

The terms and expressions which I have used are used as terms of description and not as terms of limitation, and I have no intention, in the use of such terms and expressions, of excluding any equivalents of the features shown and described or portions thereof, but recognize that various modifications are possible within the scope of the invention claimed.

Having thus fully described my invention, what I claim as new and desire to secure by Letters Patent is:

1. A gas turbine power plant comprising a main compressor and a main turbine; an auxiliary compressor and an auxiliary turbine; a combustion heat generator connecting the output side of said main compressor with the input side of said main turbine; a first duct connecting the exhaust side of said main turbine to the input side of said auxiliary turbine; a second duct connecting said first duct to the input side of said main compressor; a third duct connecting the output side of said auxiliary compressor to said second duct, a valve in said first duct for disconnecting the input side of said auxiliary turbine from the exhaust side of said main turbine; and an electrical machine connected to and rotatable with said auxiliary turbine, said electrical machine having means for operating as a generator or as a motor.

2. The gas turbine power plant as defined in claim 1 which also includes first means for automatically regulating the speed of said electrical machine, when said machine is operating as a motor, and second means for automatically controlling the position of said valve, said first and second means, in combination, varying the density of gases, entering said main compressor, as a function of the external load carried by said main turbine.

3. The gas turbine power plant as defined in claim 1 which also includes a main generator and an auxiliary generator, driven by said main turbine, first means for controlling the position of said valve as a function of instantaneous voltages produced by said generators, and second means for operating said electrical machine as a motor during a transition from a lighter to a heavier load carried by said main turbine and for increasing the speed of said motor as a function of the increase in said load, and for operating said electrical machine as a generator during a transition from a heavier load to a lighter load carried by said main turbine.

4. A gas turbine power plant comprising a main compressor-turbine set, a combustion chamber between the output side of said main compressor and the input side of said main turbine, an auxiliary compressor-turbine set, an intake port for said auxiliary compressor, said port opening into an ambient air, a first duct interconnecting the output side of said auxiliary compressor with the input side of said main compressor, a first valve in said first duct for opening said first duct to said ambient air, said first valve having means for normally maintaining said valve in closed position, a second valve in said first duct, and a second duct connecting said second valve to said combustion chamber, said second valve having means for connecting the output of said auxiliary compressor either to said first duct or to said second duct.

5. A gas turbine power plant as defined in claim 4 which also includes automatic means for opening said second valve to said second duct when the pressures in said first and second ducts are equal, and for opening said second valve to said first duct when the pressure in said second duct is greater than in said first duct.

6. A gas turbine power plant comprising a main compressor-turbine set mounted on a first shaft, an auxiliary compressor-turbine set mounted on a second shaft, a first duct connecting an exhaust of said main turbine to the input side of said auxiliary turbine, a valve in said first duct, auxiliary and main generators driven by said main turbine, and first means for controlling the position of said valve as a function of instantaneous voltages generated by said generators, said first means tending to close said valve when the voltage of said auxiliary generator is higher than the voltage of said main generator.

7. A gas turbine power plant as defined in claim 6 which also includes a second duct connecting the exhaust of said main turbine to the input of said main compressor, said second duct including a heat exchanger, a third duct connecting the output side of said auxiliary compressor with the input side of said main compressor, a second valve in said third duct for opening said third duct to an ambient atmospheric pressure, and means for normally maintaining said second valve closed, said last means including a voltage comparing means opening said second valve only when there is an abrupt lowering of an external load connected to said main generator.

8. A gas turbine power plant comprising a main compressor and a main turbine; a main generator and an auxiliary generator normally driven by said main turbine when said power plant is in operation; an auxiliary compressor and an auxiliary turbine; first duct means, including a combustion heat generator, connecting the output side of said main compressor to the input side of said main turbine; second duct means connecting the exhaust side of said main turbine to the input sides of said auxiliary turbine and said main compressor; a normally open biased valve in that portion of said second duct means which admits the exhaust gases from said main turbine into said auxiliary turbine, and means for controlling the degree of opening of said valve, said last means including: a servo motor, connected to said main generator and to said auxiliary generator, and a source of fluid pressure for decreasing the opening of said valve when there is an increase in load carried by said main turbine, and increasing the opening of said valve when there is a decrease in load carried by said main turbine.

9. A gas turbine power plant as defined in claim 8 which also includes a third duct means connecting the output side of said auxiliary compressor to the input side of said main compressor and to said combustion heat generator, a valve means within said third duct means for directing the flow of precompressed air from said auxiliary compressor either to said main compressor or to said combustion heat generator, and a pressure-responsive control means fluid-dynamically connected to said third duct means, said control means actuating said valve means to direct the precompressed fluid from said auxiliary compressor to said combustion heat generator only during the starting period of said power plant, and automatically directing the precompressed fluid to said main compressor after said main compressor and said main turbine reach their normal speed.

10. A gas turbine power plant as defined in claim 9 which also includes an additional ambient air valve means within said third duct means; and a servo motor, connected to said main generator and to said auxiliary generator, for opening said additional valve means when the voltage of said main generator is higher than the voltage of said auxiliary generator, whereby said third duct means becomes connected to and opens into an ambient air so long as said ambient air valve means remains open.

11. A gas turbine power plant comprising a main compressor and an auxiliary compressor normally discharging into the main compressor; a main turbine and an auxiliary turbine normally receiving exhaust gases from said main turbine; main and control electric generators driven by said main turbine; an electric machine rotatively coupled to said auxiliary turbine and auxiliary compressor, said electric machine having means for operating as a motor or as a generator; an electric circuit connecting said machine to said main generator, and a servo motor electrically connected to said main and control generators and mechanically connected to said means for making said electric machine work as a variable speed motor during a transition period from a steady load to a heavier load connected to said main generator, and for making said electric machine work as a generator when said main generator is connected to a steady load and during the transition period from a steady load to a lighter load.

12. A gas turbine power plant as defined in claim 11 which also includes first automatic means for connecting the output side of said auxiliary compressor and the input side of said main compressor to an ambient air upon a sudden lightening of the load connected to said main generator.

13. A gas turbine power plant as defined in claim 12 in which said first automatic means includes a second servomotor and a source of hydraulic pressure, said second servomotor having first and second three-phase armature windings, said first winding being connected to said main generator and said second winding being connected to said control generator; said windings, at steady load, producing two equal and oppositely rotating electro-magnetic fields; a normally closed, biassed ambient air valve, and a hydraulic valve operated into an open position by said second servomotor when the voltage of said main generator is higher than the voltage of said control generator, the opening of said hydraulic valve connecting said source of hydraulic pressure to said ambient air valve for opening said valve and, thereby, connecting the output side of said auxiliary compressor and the input side of said main compressor to the ambient air.

14. A gas turbine power plant as defined in claim 11 which also includes second automatic means for fluid-dynamically disconnecting said auxiliary turbine from said main turbine when there is a sudden change from a steady load to a heavier load connected to the main generator.

15. A gas turbine power plant as defined in claim 14 in which said second automatic means includes a second servomotor and a source of hydraulic pressure, said second servomotor having first and second three-phase armature windings, said first winding being connected to said main generator and said second winding being connected to said control generator; said windings, at steady load, producing two equal and oppositely rotating electro-magnetic fields; a duct connecting the exhaust side of said main turbine with the input side of said auxiliary turbine, a biassed, normally open exhaust valve in said duct, and a hydraulic valve operated into an open position by said second servomotor when the voltage of said main generator is lower than the voltage of said control generator, the opening of said hydraulic valve connecting said source of hydraulic pressure to said exhaust valve for closing said valve, thereby shutting off the exhaust gases discharging from said main turbine from the input side of said auxiliary turbine.

16. A gas turbine power plant utilizing a variable-density, constant temperature cycle, said density being a function of an external load connected to said power plant, said power plant comprising a main compressor, a main turbine for driving said main compressor; an auxiliary compressor discharging into a first duct connecting the output side of said auxiliary compressor to the input side of said main compressor; a second duct connecting the exhaust side of said main turbine to the input side of said auxiliary turbine; a third duct connecting the output side of said main compressor to the input side of said main turbine, said third duct including a combustion heat generator and a source of fuel for said combustion heat generator; an electric machine coupled to said auxiliary compressor and turbine, and means for controlling the operation of said electric machine as follows: as a generator when said main turbine is carrying a constant external load and during a transition period from one constant load to a lighter load; and as a motor during a transition period from one constant load to a heavier load, whereby said electric machine, by running faster as a motor than as a generator, controls the compression ratio of said auxiliary compressor and the density of precompressed fluid, entering said main compressor, as a function of the external load carried by said main turbine.

17. A gas turbine power plant as defined in claim 16 which also includes means for maintaining constant the temperature of gases entering the input side of said main turbine, said last means including a fuel valve and a servomotor for controlling the position of said fuel valve as a function of the external load carried by said main turbine.

18. A gas turbine power plant as defined in claim 16 which also includes means for maintaining constant the temperature of gases entering the input side of said main compressor, said last means including a heat exchanger interconnecting the exhaust side of said main turbine and the input side of said main compressor, a source of cooling fluid for said heat exchanger, and means responsive to the temperature of fluid entering said main compressor, said last means including an automatic valve, controlled by said last means, for regulating the amount of cooling fluid entering said heat exchanger.

References Cited in the file of this patent

UNITED STATES PATENTS

| | | |
|---|---|---|
| 1,737,791 | Geisen | Dec. 3, 1929 |
| 2,048,566 | Rosch | July 21, 1936 |
| 2,115,112 | Lysholm | Apr. 26, 1938 |
| 2,312,995 | Anxionnaz | Mar. 2, 1943 |
| 2,418,911 | Smith | Apr. 15, 1947 |
| 2,482,791 | Nettel | Sept. 27, 1949 |
| 2,503,289 | Nettel | Apr. 11, 1950 |
| 2,535,488 | Dros | Dec. 26, 1950 |
| 2,608,822 | Pavlecka et al. | Sept. 2, 1952 |